US007228466B2

United States Patent
Eom (10) Patent No.: US 7,228,466 B2
(45) Date of Patent: Jun. 5, 2007

(54) METHOD OF DETECTING VIOLATION OF BLOCK BOUNDARY AND APPARATUS THEREFOR

(75) Inventor: Woo-sik Eom, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 570 days.

(21) Appl. No.: 09/941,943

(22) Filed: Aug. 30, 2001

(65) Prior Publication Data
US 2002/0099986 A1 Jul. 25, 2002

(51) Int. Cl.
*G06F 11/00* (2006.01)
*G11B 20/20* (2006.01)
*G11B 27/10* (2006.01)

(52) U.S. Cl. .................... 714/707; 714/700; 369/47.28
(58) Field of Classification Search ................ 714/700, 714/707, 731, 768, 769, 770, 775, 776, 788, 714/798; 386/123, 126; 369/275.4, 123
See application file for complete search history.

(56) References Cited

U.S. PATENT DOCUMENTS

| 6,097,695 A  | *  | 8/2000  | Kobayashi   | 369/275.4 |
| 6,137,756 A  |    | 10/2000 | Yoshida et al. | |
| 6,175,686 B1 | *  | 1/2001  | Noda        | 386/123 |
| 6,404,713 B1 | *  | 6/2002  | Ueki        | 369/47.53 |
| 6,564,009 B2 | *  | 5/2003  | Owa et al.  | 386/126 |
| 6,678,236 B1 | *  | 1/2004  | Ueki        | 369/275.3 |

FOREIGN PATENT DOCUMENTS

| EP | 0 926 664 A2 | 6/1999 |
| EP | 0 926 664 A3 | 6/1999 |
| JP | 3-185684     | 6/1991 |
| JP | 4-132431     | 5/1992 |
| JP | 7-57383      | 3/1995 |
| JP | 10-283658    | 10/1998 |
| KR | 20-0141095   | 12/1998 |

OTHER PUBLICATIONS

Communication—European Search Report for Applicaiton No. 01306032.2-2223 dated Aug. 16, 2006 (3 pages).

* cited by examiner

*Primary Examiner*—Albert Decady
*Assistant Examiner*—John J. Tabone, Jr.
(74) *Attorney, Agent, or Firm*—Staas & Halsey LLP (57) ABSTRACT

A disk recording apparatus and method therefore including a boundary violation detector to determine whether a violation of a block boundary occurs on a disk by determining a phase difference between a block boundary signal and an encoding block synchronous signal.

20 Claims, 4 Drawing Sheets

METHOD OF DETECTING VIOLATION OF BLOCK BOUNDARY AND APPARATUS THEREFOR

CROSS REFERENCE TO RELATED APPLICATIONS

This application claims the benefit of Korean Application No. 2001-3582, filed Jan. 22, 2001, in the Korean Industrial Property Office, the disclosure of which is incorporated herein by reference.

BACKGROUND OF THE INVENTION

1. Field of the Invention

The present invention relates to a disk recording apparatus, and more particularly, to a block boundary violation detecting apparatus and method for preventing abnormal recording by detecting inconsistencies between an encoding block and an error correction code (ECC) block on a disk.

2. Description of the Related Art

In a disk recording apparatus, such as a DVD-R/RW drive, a DVD+RW drive, and a CD-R/RW drive, an encoding block must be recorded according to an error correction code (ECC) block on a disk, which generally consists of 16 sectors. When data in an encoding block corresponding to an ECC block is recorded in a subsequent ECC block, data recorded in the next ECC block is lost. Accordingly, the entire ECC block may not be reproduced.

SUMMARY OF THE INVENTION

Various objects and advantages of the invention will be set forth in part in the description that follows and, in part, will be obvious from the description, or may be learned by practice of the invention.

To solve the above problems, it is an object of the present invention to provide a block boundary violation method of detecting whether an encoding block is consistent with a recording block of a disk.

Accordingly, to achieve the above and other objects, the present invention provides a method of detecting a violation of a block boundary on a disk including generating a block boundary signal indicative of a boundary between error correction code (ECC) blocks using block address information recorded on the disk; detecting a phase difference between the block boundary signal and an encoding block synchronous signal; and detecting whether a violation of the boundary occurs according to a magnitude of the detected phase difference.

The present invention also provides a method of preventing abnormal recording on a disk recording apparatus by detecting inconsistencies between an encoding block and an error correction code block on a disk. The present invention also provides a method determining whether a violation of a block boundary occurs on a disk by determining a phase difference between a block boundary signal and an encoding block synchronous signal.

The present invention also provides an apparatus to detect a violation of a block boundary in a recordable disk, in which a block address is recorded, including: a decoder generating a block boundary signal showing a boundary of ECC blocks based on the block address information recorded on the disk; an encoder adding an error correction code to data provided thereto, generating an encoding block, and outputting the encoding block with an encoding block synchronous signal; and a boundary violation detector detecting a phase difference between the block boundary signal and the encoding block synchronous signal and detecting whether a violation of the boundary occurs according to a magnitude of the detected phase difference.

The present invention also provides a disk recording apparatus, including: a block boundary violation detector preventing abnormal recording on the disk recording apparatus by detecting inconsistencies between an encoding block and an error correction code block on a disk. The present invention also provides a disk recording apparatus, including: a boundary violation detector determining whether a violation of a block boundary occurs on a disk by determining a phase difference between a block boundary signal and an encoding block synchronous signal.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1A:
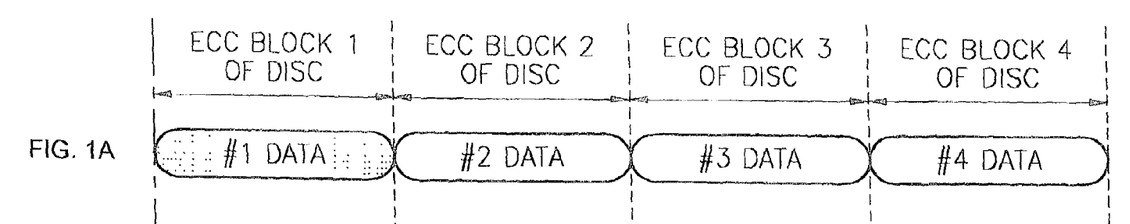
FIG. 1A shows normal recording of an encoding block in ECC blocks on a disk.
Figure 1B:
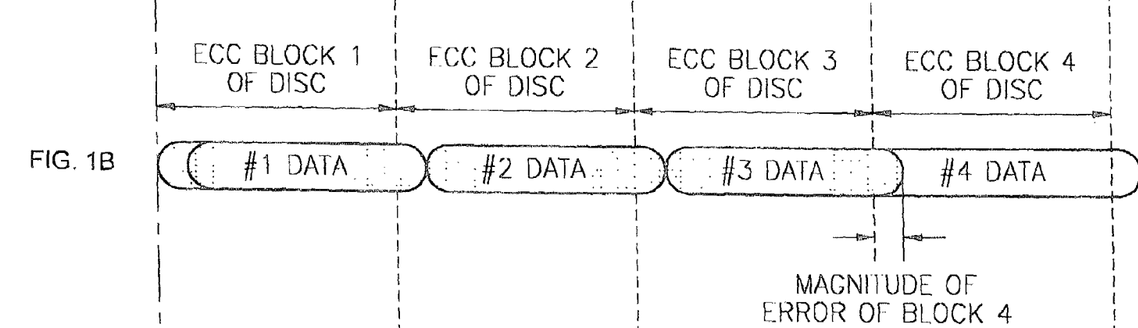
FIG. 1B shows an encoding block abnormally recorded in three ECC blocks.
Figure 1C:
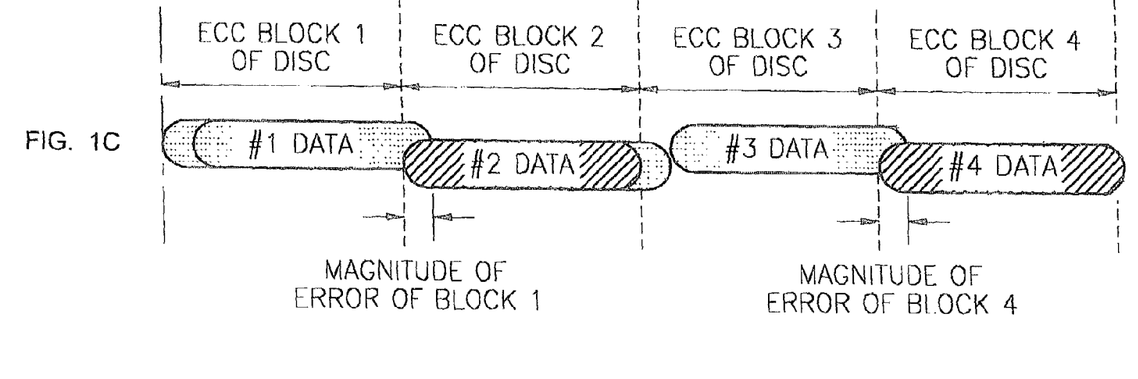
FIG. 1C shows abnormal recording overlapping with normal recording on the disk.

Reference will now made in detail to the present preferred embodiments of the present invention, examples of which are illustrated in the accompanying drawings. The embodiments are described below in order to explain the present invention by referring to the figures. FIG. 1A shows normal recording of an encoding block in ECC blocks. FIGS. 1B and 1C show cases of abnormal recording of encoding blocks in ECC blocks.

Data is recorded in error correction code (ECC) blocks in a disk. Each ECC block generally consists of 16 sectors. Data is partitioned according to a size of the ECC block. The data is then error correction encoded and then recorded. The data corresponding to the ECC block is called an encoding block. The encoding block can be normally reproduced when the encoding block is recorded from a start of the ECC block on the disk, as shown in FIG. 1A.

FIG. 1B shows a case where the encoding block is abnormally recorded in three ECC blocks. Namely, recording of #1 DATA starts at a position after ECC block 1 starts and ends at a position after the boundary between the ECC block 1 and ECC block 2. Accordingly, recording of #2 DATA starts at a position after the ECC block 2 starts and ends at a position after the boundary between the ECC block 2 and ECC block 3. Recording of #3 DATA starts at a position after the ECC block 3 starts and ends at a position after the boundary between the ECC block 3 and ECC block 4. Therefore, data that corresponds to a particular ECC block is recorded beyond the boundaries of the corresponding ECC block and recorded in a subsequent ECC block, thereby creating recording errors from the boundaries between the ECC blocks to the position where data is recorded. Accordingly, errors occur in the reproduction of the data. For instance, as shown in FIG. 1B, a magnitude of error of the ECC block 4 is measured from the boundary between the ECC block 3 and the ECC block 4 to the position in the ECC block 4 where the #4 DATA is recorded.

FIG. 1C shows a case where abnormal recording overlaps with normal recording. Namely, recording of the #1 DATA starts at a position after the ECC block 1 starts and ends at a position after the boundary between the ECC block 1 and the ECC block 2. The #2 DATA is normally recorded in the ECC block 2. Recording of the #3 DATA starts at a position after the ECC block 3 and ends at a position after the boundary between the ECC block 3 and the ECC block 4. The #4 DATA is normally recorded in the ECC block 4. Accordingly, an error occurs corresponding to a region from the start of the second ECC block to the position where the recording of #1 DATA is terminated and an error occurs corresponding to a region from the start of the fourth ECC block to the position where the recording of #3 DATA is terminated occur. Accordingly, normal reproduction of data does not occur.

A frame synchronous signal of a digital versatile disk (DVD) is recorded in units of 1488 channel bits in order to obtain byte synchronization of data. Errors of about several frames occur because data cannot be normally demodulated by a byte synchronization error at the boundary between the ECC block 1 and the ECC block 2, at the boundary between the ECC block 2 and the ECC block 3, and at the boundary between the ECC block 3 and the ECC block 4.

Such a phenomenon occurs because the encoding block cannot be recorded from the position on the disk where the ECC block starts, or the encoding block is recorded in the next ECC block on the disk. Accordingly, it is necessary to determine whether the start of the encoding block is consistent with the start of the ECC block on the disk and to perform recording according to the determination.

Figure 4:
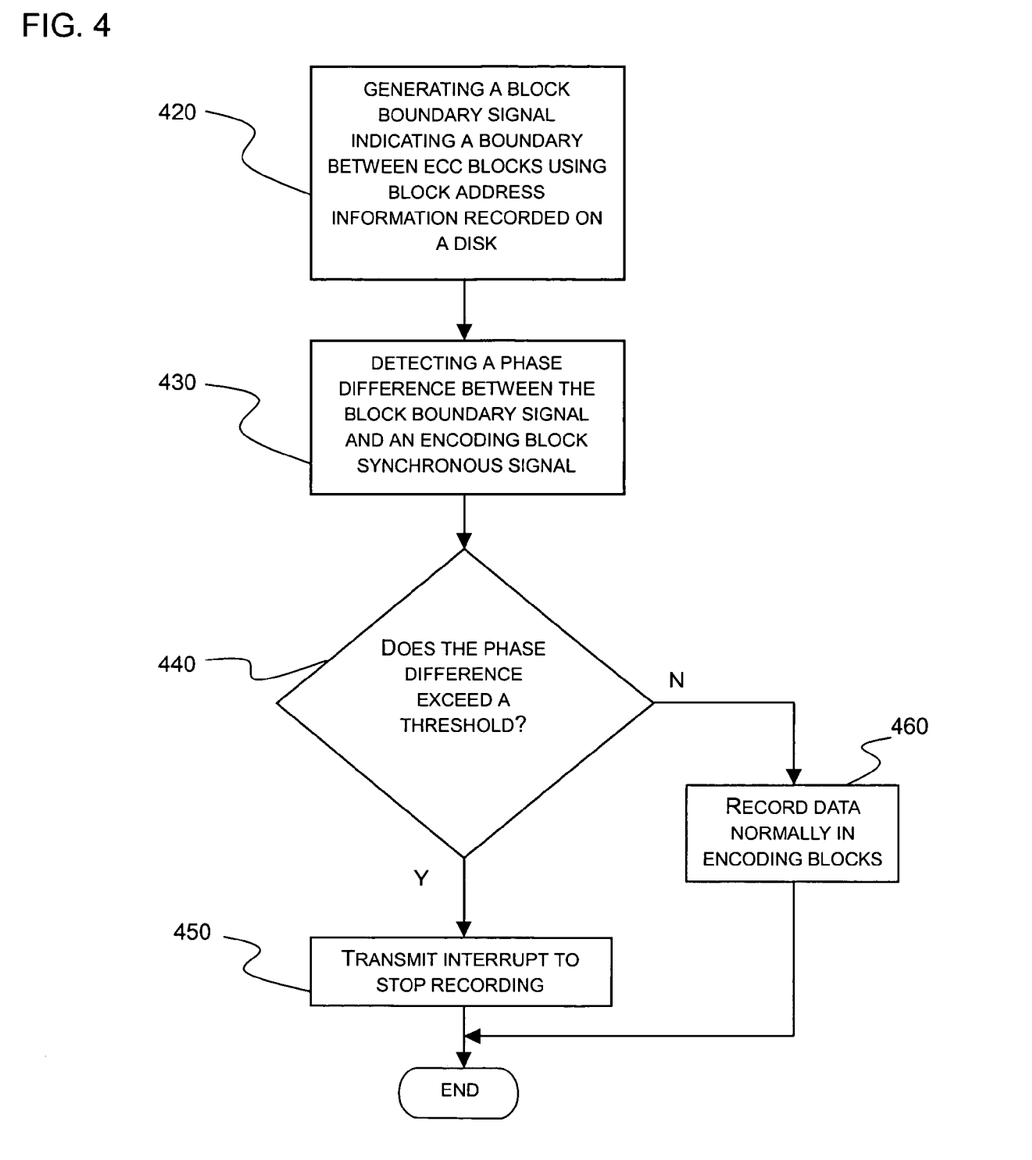
FIG. 4 illustrates exemplary operations of a method of detecting a violation of a block boundary on an optical disk.

FIG. 4 illustrates exemplary operations of a method of detecting a violation of a block boundary on an optical disk. According to the method of detecting a violation of a block boundary according to the present invention, the method determines whether the violation of the block boundary occurs by comparing block address information previously recorded on the disk with a synchronous signal of the encoding block. In particular, in operation 420 a block boundary signal indicative of a boundary between the ECC blocks is generated using the block address information recorded on the disk. A DVD-R/RW disk and a DVD+RW disk, each includes a land and a groove. In the DVD-R/RW disk, the address information of the ECC blocks, which is referred to as a land pre-pit (LPP), is generally recorded in the land. In the DVD+RW disk, the address information of the ECC blocks, which is referred to as an address in pre-groove (ADIP), is recorded as a wobble signal. The ADIP is referred to as ATIP in a CD-RW disk.

After the block boundary signal is generated in operation 420, a phase difference between the generated block boundary signal and the encoding block synchronous signal is detected in operation 430. In operation 440, whether a violation of a boundary occurs is determined according to the magnitude of the detected phase difference. When the phase of the block boundary signal is consistent with the phase of the encoding block synchronous signal, the encoding block is recorded from the boundaries between the ECC blocks on the disk in operation 460, which is normal recording. When the phase of the block boundary signal is inconsistent with the phase of the encoding block synchronous signal, the encoding block is not recorded from the boundaries between the ECC blocks on the disk in operation 460, which is abnormal recording. In this case, generating an interrupt signal or the like stops recording.

In actual recording, the phase of the block boundary signal must correspond exactly with the phase of the encoding block synchronous signal in units of bits. However, because an error of about several bits is absorbed by an error correction technique, an allowable margin can be maintained to some extent in comparing the phase of the block boundary signal with the phase of the encoding block synchronous signal.

Therefore, the method determines whether the phase of the block boundary signal is consistent with the phase of the encoding block synchronous signal within a window signal having a width determined by considering the allowable margin. To be specific, window signals are generated on the basis of the block boundary signal. For instance, a first window signal detects whether the phase of the block boundary signal leads the phase of the encoding block synchronous signal. A second window signal detects whether the block boundary signal and the encoding block synchronous signal exist within an allowable range. A third window signal detects whether the phase of the block boundary signal lags the phase of the encoding block synchronous signal.

The second window signal has a width determined by considering the allowable margin on the basis of the block boundary signal. The first window signal continues from the middle of the previous ECC block to the start of the second window signal. The third window signal continues from the end of the second window signal to the middle of the next ECC block. A window width setting unit 41, to be later described, controls the pulse width of the first window signal, the second window signal, and the third window signal.

Figure 2:
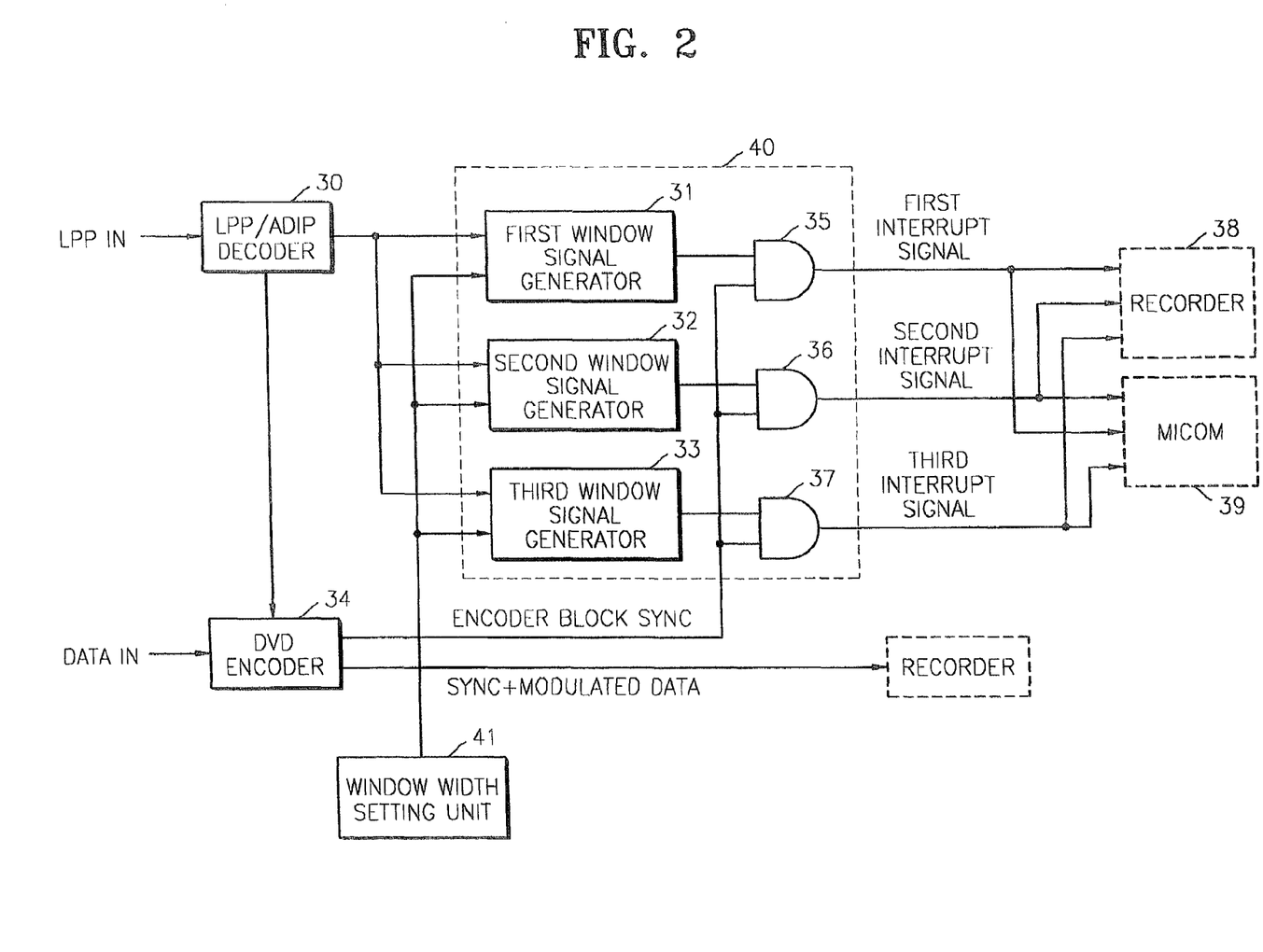
FIG. 2 is a block diagram showing an embodiment of an apparatus for detecting the violation of a block boundary according to the present invention.

FIG. 2 shows an exemplary embodiment of an apparatus for detecting violation of a block boundary according to the present invention, in which the apparatus is applied to the DVD-R/RW and the DVD+RW. The apparatus shown in FIG. 2 includes an LPP and/or ADIP ("LPP/ADIP") decoder 30, a first window signal generator 31, a second window signal generator 32, a third window signal generator 33, a DVD encoder 34, and first, second, and third AND gates 35 through 37. The window signal generators 31 through 33 and the AND gates 35 through 37 correspond to a boundary violation detector 40 that determines whether a violation of a block boundary occurs by determining the phase difference between the block boundary signal and the encoding block synchronous signal.

The LPP/ADIP decoder 30 receives an LPP signal from the DVD-R/RW disk or an ADIP signal from the DVD+RW disk and generates the block boundary signal. Specifically, each boundary between blocks is determined by the LPP signal or the ADIP signal. A pulse is generated for each boundary between blocks. Each pulse is output as the block boundary signal.

The first window signal generator 31 generates a first window signal detecting whether the phase of the block boundary signal leads the phase of the encoding block synchronous signal. The second window signal generator 32 generates a second window signal detecting whether the block boundary signal and the encoding block synchronous signal exist within the allowable range. The third window signal generator 33 generates a third window signal detecting whether the phase of the block boundary signal lags the phase of the encoding block synchronous signal. The second window signal has a width determined by considering the allowable margin on the basis of the block boundary signal. The first window signal continues from the middle of a previous ECC block to the start of the second window signal. The third window signal continues from the end of the second window signal to the middle of a next ECC block.

The DVD encoder 34 adds an error correction code to the block boundary signal and to data provided thereto, generates the encoding block, and outputs the encoding block with the encoding block synchronous signal. Further, the DVD encoder 34 may also output the data synchronously modulated to a recorder. The encoding block synchronous signal is applied to the first, second, and third AND gates 35, 36, 37 of FIG. 2.

The first, second, and third AND gates 35, 36, 37 compare the encoding block synchronous signal provided by the DVD encoder 34 with the first window signal from the first window signal generator 31, the second window signal from the second window signal generator 32, and the third window signal from the third window signal generator 33. The first, second, and third AND gates 35, 36, 37 output a compared result as a first interrupt signal, a second interrupt signal, and a third interrupt signal, respectively. In this instance, the second interrupt signal shows a state where the block boundary signal and the encoding block synchronous signal exist within an allowable range and normal recording can be performed. The first interrupt signal and the third interrupt signal show a state where the block boundary signal and the encoding block synchronous signal are not within the allowable range and normal recording cannot be performed. A recorder 38 and a microprocessor 39 perform recording, stop recording, and take necessary measures according to the states of the first interrupt signal, the second interrupt signal, and the third interrupt signal.

Figure 3A:
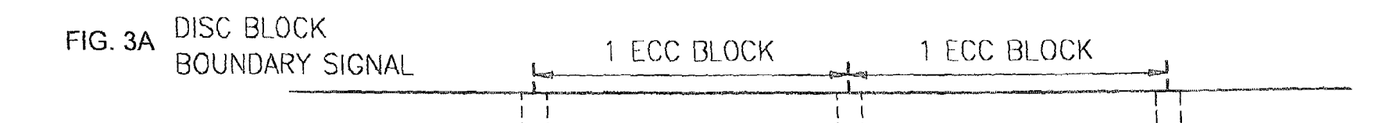
FIG. 3A shows a block boundary signal generated by an LPP and/or ADIP decoder of FIG. 2.
Figure 3B:
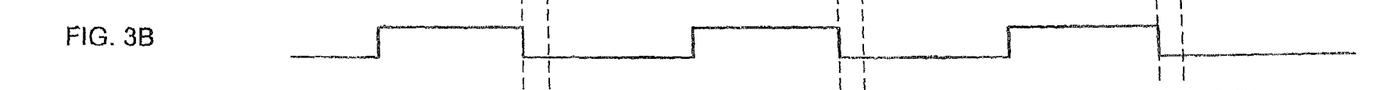
FIG. 3B shows a first window signal generated by a first window signal generator of FIG. 2.
Figure 3C:
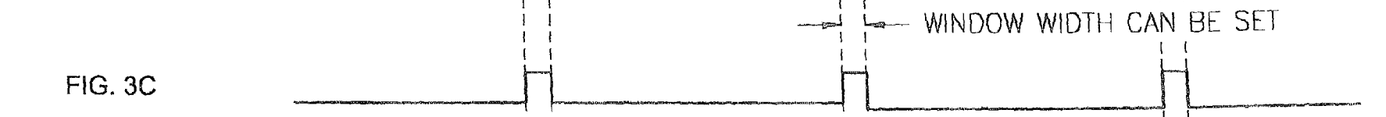
FIG. 3C shows a second window signal generated by a second window signal generator of FIG. 2.
Figure 3D:
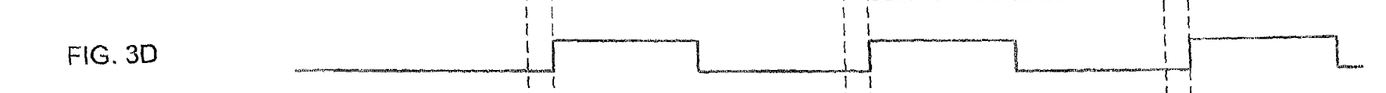
FIG. 3D shows a third window signal generated by a third window signal generator of FIG. 2.

FIGS. 3A through 3H are timing diagrams showing the operations of the apparatus shown in FIG. 2. Specifically, FIG. 3A shows a block boundary signal generated by the LPP/ADIP decoder 30 of FIG. 2. The block boundary signal is a mono multi-pulse signal generated at the boundary between the ECC blocks. FIG. 3B shows the first window signal generated by the first window signal generator 31 of FIG. 2. FIG. 3C shows the second window signal generated by the second window signal generator 32 of FIG.2. FIG. 3D shows the third window signal generated by the window signal generator 33 of FIG. 2.

The second window signal has a pulse width determined by considering an allowable margin on the basis of the block boundary signal. The first window signal continues from the middle of the previous ECC block to the start of the second window signal. The third window signal continues from the end of the second window signal to the middle of the next ECC block.

Figure 3E:
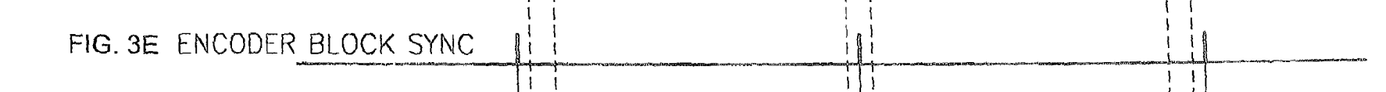
FIG. 3E shows an encoding block synchronous signal generated by a DVD encoder of FIG. 2.
Figure 3F:
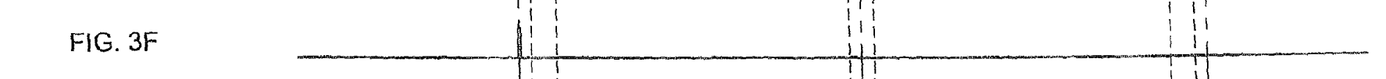
FIG. 3F shows a first interrupt signal diagram generated by a first AND gate.
Figure 3G:
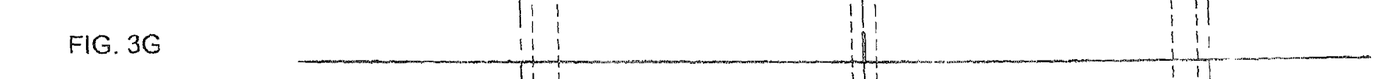
FIG. 3G shows a second interrupt signal diagram generated by a second AND gate.
Figure 3H:
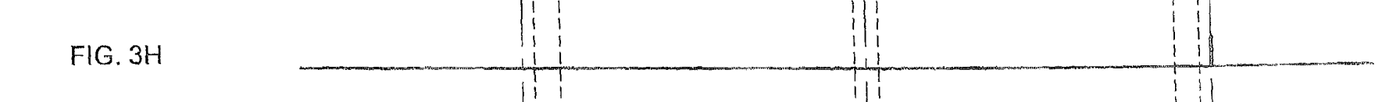
FIG. 3H shows a third interrupt signal diagram generated by a third AND gate.

FIG. 3E shows the encoding block synchronous signal generated by the DVD encoder 34 of FIG. 2. FIG. 3F shows the first interrupt signal generated by the first AND gate 35. FIG. 3G shows the second interrupt signal generated by the second AND gate 36. FIG. 3H shows the third interrupt signal generated by the third AND gate 37.

The second interrupt signal denotes a state where normal recording can be performed. The first interrupt signal and the third interrupt signal show a state where the abnormal recording is performed. The recorder 38 records the signal provided by the DVD encoder 34 in the ECC block of the disk when the second interrupt signal is generated and stops recording when the first interrupt signal and the third interrupt signal are generated. The microprocessor 39 allows normal recording to be performed by controlling a servo (not shown) when the first interrupt signal and the third interrupt signal are generated.

In the embodiment shown in FIG. 2, the window signal is generated on the basis of the block boundary signal and it is determined whether violation of a block boundary occurs by performing an AND operation on the window signal and the encoding block synchronous signal. Thus, an apparatus for determining a phase difference between the block boundary signal and the encoding block synchronous signal and determining whether the violation of a block boundary occurs according to the magnitude of the phase difference can be realized.

As mentioned above, according to the present invention, an apparatus and method are provided detecting a violation of a block boundary to prevent abnormal recording on a disk. Data can be normally recorded by comparing a phase of a start of an encoding block with a phase of a boundary of an ECC block on a disk, thus determining whether normal recording can be performed.

While the invention has been described with reference to the exemplary embodiments thereof, those skilled in the art will be able to make various modifications to the described embodiments of the invention without departing from the true spirit and scope of the invention.

What is claimed is:

1. A method of detecting a violation of a block boundary on a disk, comprising:

generating a block boundary signal indicative of a boundary between error correction code (ECC) blocks using block address information recorded on the disk;

detecting a phase difference between the block boundary signal and an encoding block synchronous signal; and detecting whether a violation of the boundary occurs according to a magnitude of the detected phase difference, wherein the detecting of the phase difference comprises:

generating a window signal indicative of a recording allowable range based on the block boundary signal; and performing a logic operation on the window signal generated indicative of the recording allowable range and the encoding block synchronous signal and detecting whether an encoding block boundary is within the allowable range.

2. The method as recited in claim 1, wherein the detecting the phase difference further comprises:
generating window signals detecting whether a phase of the block boundary signal leads a phase of the encoding block synchronous signal or whether the phase of the block boundary signal lags the phase of the encoding block synchronous signal; and
detecting whether a violation of the boundary occurs by performing a logic operation on the window signals detecting whether the phase of the block boundary signal leads the phase of the encoding block synchronous signal and the encoding block synchronous signal.

3. The method as recited in claim 1, wherein the disk is one of a DVD-R disk, a DVD-RW disk, a DVD+RW disk, a CD-R disk, and a CD-RW disk.

4. The method as recited in claim 1, wherein the generating of the block boundary signal uses block address information of the ECC blocks recorded on the disk.

5. The method as recited in claim 1, wherein the disk is a DVD-R/RW disk and the address information of the ECC blocks is recorded in a land of the disk.

6. The method as recited in claim 1, wherein the disk is in a DVD+RW disk and the address information of the ECC blocks is recorded as a wobble signal.

7. The method as recited in claim 1, further comprising:
normally recording in response to the phase of the block boundary signal being consistent with the phase of the encoding block synchronous signal.

8. The method as recited in claim 7, wherein the normally recording comprises recording the encoding block from the boundaries between the ECC blocks on the disk.

9. The method as recited in claim 1, further comprising performing an error correction to provide for a margin of error between a phase of the block boundary signal and a phase of the encoding block synchronous signal.

10. The method as recited in claim 1, further comprising:
determining whether a phase of the block boundary signal is consistent with a phase of the encoding block synchronous signal within a window signal having a width determined by considering a margin of error.

11. The method as recited in claim 1, further comprising:
abnormally recording in response to the phase of the block boundary signal being inconsistent with the phase of the encoding block synchronous signal.

12. The method as recited in claim 11, wherein the abnormally recording comprises stopping recording by generating an interrupt signal.

13. A method, comprising:
preventing abnormal recording on a disk recording apparatus by detecting inconsistencies between an encoding block and an error correction code block on a disk;
receiving a signal from the disk and generating a block boundary signal therefrom, wherein each boundary between blocks is determined by the signal from the disk;
generating a first window signal detecting whether a phase of the block boundary signal leads a phase of an encoding block synchronous signal from the encoding block;
generating a second window signal detecting whether the block boundary signal and the encoding block synchronous signal exist within a range;
generating a third window signal detecting whether the phase of the block boundary signal lags the phase of the encoding block synchronous signal;
comparing the encoding block synchronous signal with the first window signal and outputting a first interrupt signal;
comparing the encoding block synchronous signal with the second window signal and outputting a second interrupt signal;
comparing the encoding block synchronous signal with the third window signal and outputting a third interrupt signal;
recording or stopping recording, according to the states of the first interrupt signal, the second interrupt signal, and the third interrupt signal;
adding an error correction code to the block boundary signal;
generating the encoding block; and
outputting the encoding block with the encoding block synchronous signal based on the second interrupt signal,
wherein:
the first window signal continues from a middle of a previous ECC block to a start of the second window signal,
the second window signal comprises a width determined by considering a margin on the basis of the block boundary signal, and
the third window signal continues from an end of the second window signal to a middle of a next ECC block.

14. An apparatus to detect a violation of a block boundary in a recordable disk, in which a block address information is recorded, comprising:
a decoder generating a block boundary signal showing a boundary of ECC blocks based on the block address information recorded on the disk;
an encoder adding an error correction code to data provided thereto, generating an encoding block, and outputting the encoding block with an encoding block synchronous signal; and
a boundary violation detector detecting a phase difference between the block boundary signal and the encoding block synchronous signal and detecting whether a violation of the boundary occurs according to a magnitude of the detected phase difference,
wherein the boundary violation detector comprises:
a first window signal generator generating a first window signal detecting whether a phase of the block boundary signal leads a phase of the encoding block synchronous signal;
a third window signal generator generating a third window signal detecting whether the phase of the block boundary signal lags the phase of the encoding block synchronous signal; and
a first logic gate and a third logic gate performing a logic operation on the first window signal, the third window signal, and the encoding block synchronous signal and detecting therefrom whether the block boundary signal and the encoding block synchronous signal are within a recording allowable range.

15. The apparatus as recited in claim 14, wherein the boundary violation detector further comprises:
a second window signal generator generating a second window signal indicative of the recording allowable range based on the block boundary signal; and a second logic gate performing a logic operation on the second window signal and the encoding block synchronous signal and detecting therefrom whether the block boundary signal and the encoding block synchronous signal are within the recording allowable range.

16. The apparatus as recited in claim 14, wherein the disk is one a DVD-R disk, a DVD-RW disk, a DVD+RW disk, a CD-R disk, and a CD-RW disk.

17. A disk recording apparatus, comprising:
  a boundary violation detector determining whether a violation of a block boundary occurs on a disk by determining a phase difference between a block boundary signal and an encoding block synchronous signal, wherein the boundary violation detector comprises:
    a land pre-pit (LPP) and/or an address in pre-groove (ADIP) decoder receiving a signal from the disk and generating a block boundary signal therefrom, wherein each boundary between blocks is determined by the signal from the disk;
    a first window signal generator generating a first window signal detecting whether a phase of the block boundary signal leads a phase of an encoding block synchronous signal from the encoding block;
    a second window signal generator generating a second window signal detecting whether the block boundary signal and the encoding block synchronous signal exist within a range;
    a third window signal generator generating a third window signal detecting whether the phase of the block boundary signal lags the phase of the encoding block synchronous signal;
    a first logic gate comparing the encoding block synchronous signal with the first window signal and outputting a first interrupt signal;
    a second logic gate comparing the encoding block synchronous signal with the second window signal and outputting a second interrupt signal;
    a third logic gate comparing the encoding block synchronous signal with the third window signal and outputting a third interrupt signal; and
    a recorder and a microprocessor recording or stopping recording, according to the states of the first interrupt signal, the second interrupt signal, and the third interrupt signal.

18. The disk recording apparatus as recited in claim 17, further comprising:
  a DVD encoder adding an error correction code to the block boundary signal, generating the encoding block, and outputting the encoding block with the encoding block synchronous signal.

19. The disk recording apparatus as recited in claim 18, wherein:
  the first window signal continues from a middle of a previous ECC block to a start of the second window signal,
  the second window signal comprises a width determined by considering a margin on the basis of the block boundary signal, and
  the third window signal continues from an end of the second window signal to a middle of a next ECC block.

20. The disk recording apparatus as recited in claim 17, wherein the LPP and/or ADIP decoder generates a pulse for each boundary between blocks and outputs the pulse as the block boundary signal.

* * * * *

UNITED STATES PATENT AND TRADEMARK OFFICE
CERTIFICATE OF CORRECTION

| | | |
|---|---|---|
| PATENT NO. | : 7,228,466 B2 | Page 1 of 1 |
| APPLICATION NO. | : 09/941943 | |
| DATED | : June 5, 2007 | |
| INVENTOR(S) | : Woo-sik Eom | |

It is certified that error appears in the above-identified patent and that said Letters Patent is hereby corrected as shown below:

TITLE PAGE, ITEM (56) (Other Publications), Line 1, change "Applicaiton" to --Application--.

Signed and Sealed this

Sixth Day of November, 2007

JON W. DUDAS
*Director of the United States Patent and Trademark Office*